United States Patent
Barrett et al.

(10) Patent No.: US 11,895,249 B2
(45) Date of Patent: *Feb. 6, 2024

(54) METHOD AND SYSTEM FOR REDUCED V2X RECEIVER PROCESSING LOAD USING NETWORK BASED APPLICATION LAYER MESSAGE PROCESSING

(71) Applicant: MALIKIE INNOVATIONS LIMITED, Dublin (IE)

(72) Inventors: Stephen John Barrett, Haywards Heath (GB); John Octavius Goyo, Acton (CA)

(73) Assignee: Malikie Innovations Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/120,146

(22) Filed: Mar. 10, 2023

(65) Prior Publication Data

US 2023/0216695 A1 Jul. 6, 2023

Related U.S. Application Data

(63) Continuation of application No. 17/695,678, filed on Mar. 15, 2022, now Pat. No. 11,632,253, which is a
(Continued)

(51) Int. Cl.
*H04L 9/32* (2006.01)
*H04L 51/18* (2022.01)
*H04W 12/63* (2021.01)

(52) U.S. Cl.
CPC ............ *H04L 9/3263* (2013.01); *H04L 51/18* (2013.01); *H04W 12/63* (2021.01)

(58) Field of Classification Search
None
See application file for complete search history.

(56) References Cited

U.S. PATENT DOCUMENTS

| 8,314,718 B2 | 9/2012 | Muthaiah et al. |
| 8,856,516 B2 | 10/2014 | Rescorla et al. |

(Continued)

FOREIGN PATENT DOCUMENTS

| CA | 2959719 A1 | 3/2016 |
| CN | 1842990 A | 10/2006 |

(Continued)

OTHER PUBLICATIONS

3GPP, Technical Specification 23.285, "Architecture enhancements for V2X services" version 14.5.0, Dec. 22, 2017.
(Continued)

*Primary Examiner* — Nelson S. Giddins
(74) *Attorney, Agent, or Firm* — Botos Churchill IP Law LLP

(57) ABSTRACT

A method at a network element for processing a first message destined for an intelligent transportation system station, the method including receiving from a sending entity, or generating, the first message at the network element; based on a source or contents of the first message, performing one of: discarding the first message; or modifying the first message to provide an indication to the intelligent transportation system station of checks the intelligent transportation system does not need to perform, thereby creating a second message; and forwarding the second message to the intelligent transportation system station.

20 Claims, 8 Drawing Sheets

Related U.S. Application Data continuation of application No. 15/948,210, filed on Apr. 9, 2018, now Pat. No. 11,303,458.

(56) References Cited

U.S. PATENT DOCUMENTS

| | | |
|---|---|---|
| 8,923,147 B2 | 12/2014 | Krishnaswamy et al. |
| 9,063,647 B2 | 6/2015 | Zotov |
| 2002/0184182 A1 | 12/2002 | Kwan |
| 2003/0093676 A1 | 5/2003 | Kawamura et al. |
| 2005/0262552 A1 | 11/2005 | Brown et al. |
| 2007/0050624 A1 | 3/2007 | Lord et al. |
| 2007/0142037 A1* | 6/2007 | O'Toole ............ G08G 1/09675 455/414.1 |
| 2011/0080302 A1* | 4/2011 | Muthaiah ............ H04W 12/069 340/903 |
| 2013/0230173 A1 | 9/2013 | Hori |
| 2014/0020098 A1 | 1/2014 | Stahlin |
| 2016/0140842 A1 | 5/2016 | Park et al. |
| 2016/0203711 A1 | 7/2016 | Scherping et al. |
| 2016/0280371 A1 | 9/2016 | Canavor et al. |
| 2017/0180989 A1 | 6/2017 | Etzel |
| 2017/0277884 A1 | 9/2017 | Hsu |
| 2018/0097637 A1 | 4/2018 | Weinfield |
| 2019/0245705 A1 | 8/2019 | Kumar |
| 2019/0387558 A1 | 12/2019 | Cao |

FOREIGN PATENT DOCUMENTS

| | | |
|---|---|---|
| CN | 101438225 A | 5/2009 |
| CN | 102281288 A | 12/2011 |
| CN | 103098436 A | 5/2013 |
| CN | 103560889 A | 2/2014 |
| CN | 105592059 A | 5/2016 |
| CN | 107078789 A | 8/2017 |
| EP | 1594251 A1 | 11/2005 |
| EP | 2579498 A1 | 4/2013 |
| JP | 2004179724 A | 6/2004 |

OTHER PUBLICATIONS

IEEE Standard 1609.2, "IEEE Standard for Wireless Access in Vehicular Environments—Security Services for Applications and Management Messages", 2016.
ETSI, European Standard EN 302 637-2, "ITS, Vehicular comms, Basic set of applications, Part 2: Specification of co-operative awareness basic service", Nov. 2014.
ETSI, European Standard EN 302 637-3, "ITS, Vehicular comms, Basic set of applications, Part 3: Specifications of Decentralized Environmental Notification Basic Service", version 1.2.1, Sep. 2014.
William Whyte, Andre Weimerskirch, Virendra Kumar, Thorsten Hehn, "A Security Credential Management System for V2V Communications", 2013 IEEE Vehicular Networking Conference (VNC 2013), Dec. 16-18, 2013.
Crash Avoidance Metrics Partners (CAMP) Vehicle Safety Communications 5 Consortium, "Security Credential Management System Proof-of-Concept Implementation—EE Requirements and Specifications Supporting SCMS Software Release 1.1", May 4, 2016.
Crash Avoidance Metrics Partners (CAMP) Vehicle Safety Communications 5 Consortium, "Security Credential Management System Proof-of-Concept Implementation—EE Requirements and Specifications Supporting SCMS Software Release 1.2.2", Nov. 15, 2016.
Virendra Kumar, Jonathan Petit, William Whyte, "Binary Hash Tree based Certificate Access Management", International Association for Crptological Research, 2017.
3GPP, Technical Specification 36.331, "Evolved Universal Terrestrial Radio Access (E-UTRA); Radio Resource Control (RRC); Protocol specification" version 15.0.1, Jan. 9, 2018.
Society of Automotive Engineers (SAE), standard J2735, "Dedicated Short Range Communications (DSRC) Message Set Dictionary", Mar. 30, 2016.
3GPP, Technical Specification 24.301, "Non-Access-Stratum (NAS) protocol for Evolved Packet System (EPS); Stage 3", version 15.2.0, Mar. 29, 2018.
3GPP, Technical Specification 23.401, "General Packet Radio Service (GPRS) enhancements for Evolved Universal Terrestrial Radio Access Network (E-UTRAN) access", version 15.3.0, Mar. 27, 2018.
American National Standards Institute (ANSI), Standard X9.62, "Public Key Cryptography For The Financial Services Industry: The Elliptic Curve Digital Signature Algorithm (ECDSA)", Nov. 16, 2005.
Standards for Efficient Cryptography Group (SECG), "Standards for Efficient Cryptography: SEC 1: Elliptic Curve Cryptography", Version 2, May 21, 2009.
IEEE, Standard 802.11p, "Standard for Information technology—Local and metropolitan area networks—Specific requirements—Part 11: Wireless LAN Medium Access Control (MAC) and Physical Layer (PHY) Specifications Amendment 6: Wireless Access in Vehicular Environments", 2010.
Patent Cooperation Treaty, International Search Report for International Application No. PCT/CA2019/050417, dated Jun. 28, 2019.
Extended European Search Report, EP Application No. 3,744,052, dated Feb. 3, 2021.
3GPP TR 33.885, "3rd Generation Partnership Project; Tehcnical Specification Group Services and System Aspects; Study on security aspects for LTE support of Vehicle-to-Everything (V2X) services (Release 14)", v.14.0.0, Jun. 15, 2017, XP051298608.
Norbert Bismeyer et al., "V2X Security Architectures v2", Preserve, IST-269994, Jan. 31, 2014, retrieved from the Internet at https://www.preserve-project.eu/www.preserve-project.eu/sites/preserve-project.eu/files/PRESRVE-D1.3-V2X_Security_Architecture_V2.pdf.
Chinese Office Action and search report, CN2019800228235, dated Jan. 5, 2022.
Li Wen et al., "Deployment scheme of certificate revocation lists for privacy protection in vehicle area network", Application Research of Computers, vol. 32, No. 9, Sep. 2015.
Huawei, "V2X security architecture based on the new security elements", 3GPP TSG SA WG3 (Security) Meeting #85, S3-161760, Nov. 7-11, 2016.
Chinese Patent Application 201980022823.5, "Method, Network Element and Medium for Reduced V2X Receiver Processing Load", Notice of Allowance, dated Aug. 11, 2022.
Chinese Patent Application 201980022823.5, "Method, Network Element and Medium for Reduced V2X Receiver Processing Load", Search Report for Notice of Grant, dated Aug. 11, 2022.
Office Action for Canadian Patent Application No. 3,091,714, dated Oct. 20, 2023, 3 Pages.

* cited by examiner

METHOD AND SYSTEM FOR REDUCED V2X RECEIVER PROCESSING LOAD USING NETWORK BASED APPLICATION LAYER MESSAGE PROCESSING

FIELD OF THE DISCLOSURE

The present disclosure relates to intelligent transportation systems (ITS) and, in particular, relates to communication between ITS stations.

BACKGROUND

Intelligent transport systems are systems in which a plurality of devices communicate to allow for the transportation system to make better informed decisions with regard to transportation and traffic management, as well as allowing for safer and more coordinated decision-making. ITS system components may be provided within vehicles, as part of the fixed infrastructure such as on bridges or at intersections, and for other users of the transportation systems including pedestrians or bicyclists.

ITS system deployment is receiving significant focus in many markets around the world, with radiofrequency bands being allocated for the communications. In addition to vehicle to vehicle communications for safety critical and non-critical applications, further enhancements are being developed for vehicle to infrastructure and vehicle to portable scenarios.

An ITS station is any entity that may provide ITS communications, including vehicles, infrastructure components, mobile devices, among other options. In some cases, such ITS station may transmit erroneous data, either willfully or unintentionally. For example, a ITS station may have a faulty sensor which may provide faulty data in ITS messaging. In other cases, a malicious user may insert false information in messages that would cause the intelligent transportation system to work incorrectly. Typically, when such behavior is detected, an identifier of one or more certificates of the misbehaving ITS station may be placed on a Certificate Revocation List (CRL), which may be used to manage misbehaving ITS stations. An ITS station that receives a message from another ITS station having a certificate on the CRL can then either ignore such message or discount the significance of the information within such message.

However, the use of CRLs to manage misbehaving ITS endpoints has drawbacks. Specifically, the length of CRLs can be large since the CRL may pertain to a very large geographic area which has many vehicles and other ITS stations in such geographic area. Further, each ITS station may have multiple certificates and therefore there may be multiple CRLs per ITS application or service type.

BRIEF DESCRIPTION OF THE DRAWINGS

The present disclosure will be better understood with reference to the drawings, in which.

DETAILED DESCRIPTION OF THE DRAWINGS

Figure 1:
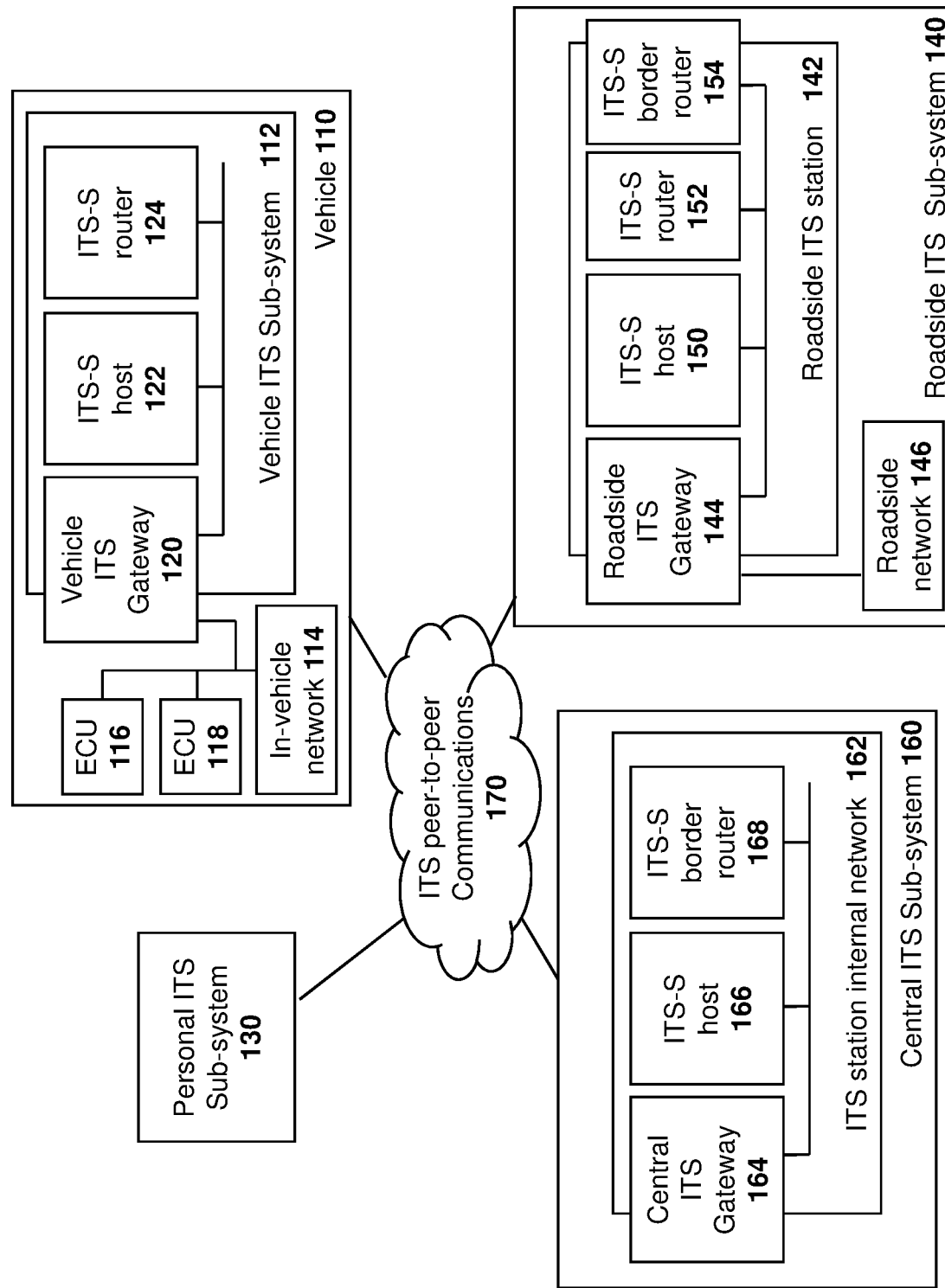
FIG. 1 is block diagram of an intelligent transportation system.

The present disclosure provides a method at a network element for processing a first message destined for an intelligent transportation system station, the method comprising: receiving from a sending entity, or generating, the first message at the network element; based on a source or contents of the first message, performing one of: discarding the first message; or modifying the first message to provide an indication to the intelligent transportation system station of checks the intelligent transportation system does not need to perform, thereby creating a second message; and forwarding the second message to the intelligent transportation system station.

The present disclosure further provides a network element configured for processing a first message destined for an intelligent transportation system station, the network element comprising: a processor; and a communications subsystem, wherein the network element is configured to: receive from a sending entity, or generate, the first message at the network element; based on a source or contents of the first message, perform one of: discarding the first message; or modifying the first message to provide an indication to the intelligent transportation system station of checks the intelligent transportation system does not need to perform, thereby creating a second message; and forwarding the second message to the intelligent transportation system station.

The present disclosure further provides a computer readable medium for storing instruction code for processing a first message destined for an intelligent transportation system station, which, when executed by a processor of a network element cause the network element to: receive from a sending entity, or generate, the first message at the network element; based on a source or contents of the first message, perform one of: discarding the first message; or modifying the first message to provide an indication to the intelligent transportation system station of checks the intelligent transportation system does not need to perform, thereby creating a second message; and forwarding the second message to the intelligent transportation system station.

In the embodiments described below, the following terminology may have the following meaning, as provided in Table 1.

TABLE 1

| | Terminology |
|---|---|
| Term | Brief Description |
| ITS Station | A communication device associated with the ITS system. In particular, an Intelligent Transport System endpoint which generates or receives V2X messages. An ITS station may for example be |

TABLE 1-continued

Terminology

| Term | Brief Description |
|---|---|
| | associated with a road user such as a car, truck, motorcycle, cyclist, pedestrian, animal, or with a road side unit. |
| Road user | Vehicle, truck, lorry, motorbike, cyclist, pedestrian, animal |
| Road Side Unit | A unit on the side of the road that may generate and/or read V2X messages. |
| V2X capable vehicle | A vehicular ITS Station |
| V2X application server | A message processing function which from a protocol point of view sits above the Layer 3 and Layer 2 connectivity provided by the network. It could potentially be operated by an operator of the 3GPP network (or else by a non-3GPP operator) and could potentially be integrated with cellular network functionality. |

Intelligent Transportation System software and communication systems are designed to enhance road safety and road traffic efficiency. Such systems include vehicle to/from vehicle (V2V) communications, vehicle to/from infrastructure (V2I) communications, vehicle to/from network (V2N) communications, and vehicle to/from the pedestrian or portable (V2P) communications. The communications from a vehicle to/from any of the above may be generally referred to as V2X. Further, other elements may communicate with each other. Thus, systems may include portable to/from infrastructure (P2I) communications, infrastructure to infrastructure (I2I) communications, portable to portable (P2P) communications, among others. As used herein, V2X thus includes any communication between an ITS station and another ITS station, where the station be associated with a vehicle, road side unit, network element, pedestrian, cyclist, animal, among other options.

Such communications allow the components of the transportation system to communicate with each other. For example, vehicles on a highway may communicate with each other, allowing a first vehicle to send a message to one or more other vehicles to indicate that it is braking, thereby allowing vehicles to follow each other more closely.

Communications may further allow for potential collision detection and allow a vehicle with such a device to take action to avoid a collision, such as braking or swerving. For example, an active safety system on a vehicle may take input from sensors such as cameras, radar, LIDAR, and V2X, and may act on them by steering or braking, overriding or augmenting the actions of the human driver or facilitating autonomous driving where a human is not involved at all. Another type of advanced driver assistance system (ADAS) is a passive safety system that provides warning signals to a human driver to take actions. Both active and passive safety ADAS systems may take input from V2X and ITS systems.

In other cases, fixed infrastructure may give an alert to approaching vehicles that they are about to enter a dangerous intersection or alert vehicles to other vehicles or pedestrians approaching the intersection. This alert can include the state of signals at the intersection (signal phase and timing (SPaT)) as well as position of vehicles or pedestrians or hazards in the intersection. Other examples of ITS communications would be known to those skilled in the art.

Reference is now made to FIG. 1, which shows one example of an ITS station, as described in the European Telecommunications Standards Institute (ETSI) European Standard (EN) 302665, "Intelligent Transport Systems (ITS); communications architecture", as for example provided for in version 1.1.1, September 2010.

In the embodiment of FIG. 1, a vehicle 110 includes a vehicle ITS sub-system 112. Vehicle ITS sub-system 112 may, in some cases, communicate with an in-vehicle network 114. The in-vehicle network 114 may receive inputs from various electronic control unit (ECUs) 116 or 118 in the environment of FIG. 1.

Vehicle ITS sub-system 112 may include a vehicle ITS gateway 120 which provides functionality to connect to the in-vehicle network 114.

Vehicle ITS sub-system 112 may further have an ITS-S host 122 which contains ITS applications and functionality needed for such ITS applications.

Further, an ITS-S router 124 provides the functionality to interconnect different ITS protocol stacks, for example at layer 3. ITS-S router 124 may be capable of converting protocols, for example for the ITS-S host 122.

Further, the ITS system of FIG. 1 may include a personal ITS sub-system 130, which may provide application and communication functionalities of ITS communications (ITSC) in handheld or portable devices, such as personal digital assistants (PDAs) mobile phones, user equipment, among other such devices.

A further component of the ITS system shown in the example of FIG. 1 includes a roadside ITS sub-system 140, which may contain roadside ITS stations which may be deployed on bridges, traffic lights, among other options.

The roadside sub-system 140 includes a roadside ITS station 142 which includes a roadside ITS gateway 144. Such gateway may connect the roadside ITS station 142 with proprietary roadside networks 146.

A roadside ITS station may further include an ITS-S host 150 which contains ITS-S applications and the functionalities needed for such applications.

The roadside ITS station 142 may further include an ITS-S router 152, which provides the interconnection of different ITS protocol stacks, for example at layer 3.

The ITS station 142 may further include an ITS-S border router 154, which may provide for the interconnection of two protocol stacks, but in this case with an external network.

A further component of the ITS system in the example of FIG. 1 includes a central ITS sub-system 160 which includes a central ITS station internal network 162.

Central ITS station internal network 162 includes a central ITS gateway 164, a central ITS-S host 166 and a ITS-S border router 168. Gateway 164, central ITS-S host 166 and ITS border router 168 have similar functionality to the gateway 144, ITS host 150 and ITS-S border router 154 of the roadside ITS station 142.

Communications between the various components may occur through a ITS peer-to-peer communications network or via network infrastructure 170.

From FIG. 1 above, V2X communications may be used for both road safety and for improving efficiency of road transportation, including movement of vehicles, reduced fuel consumption, among other factors.

V2X messages are defined by the European Telecommunications Standards Institute (ETSI) fall into two categories, namely Cooperative Awareness Message (CAM) and Decentralized Environmental Notification Message (DENM). A CAM message is a periodic, time triggered message which may provide status information to neighboring ITS stations. The broadcast is typically over a single hop and the status information may include a station type, position, speed, heading, among other options. Optional fields in a CAM message may include information to indicate whether the ITS station is associated with roadworks, rescue vehicles, or a vehicle transporting dangerous goods, among other such information.

Typically, a CAM message is transmitted between 1 and 10 times per second.

A DENM message is an event triggered message that is sent only when a trigger condition is met. For example, such trigger may be a road hazard or an abnormal traffic condition. A DENM message is broadcast to an assigned relevance area via geo-networking. It may be transported over several wireless hops and event information may include details about the causing event, detection time, event position, event speed, heading, among other factors. DENM messages may be sent, for example, up to 20 times per second over a duration of several seconds.

Similar concepts apply to the Dedicated Short Range Communications (DSRC)/Wireless Access In Vehicular Environments (WAVE) system in which a Basic Safety Message is specified instead of the CAM/DENM messaging from ETSI.

Cellular V2X

Various systems or architectures can provide V2X communication. Cellular networks, such as those defined in the Third Generation Partnership Project (3GPP) set of specifications are one of them. As defined above, another alternative is DSRC/WAVE which makes use of the Institute of Electrical and Electronics Engineers (IEEE) 802.11 radio technology. Thus, while the present disclosure is described with regards to cellular V2X communication, V2X messages may equally be sent through networks which are not 3GPP cellular networks. In particular, V2X communication may in one case proceed via the infrastructure using 802.11 technology Using the cellular example, various options are possible. These include unicast uplink and/or downlink via the infrastructure. A further option includes broadcast downlink transmission via the infrastructure. A further option includes side link broadcast by a device.

The various transmission modes may be combined. For example, a side link (PC5) or Uu unicast uplink transmission might be used to get a V2X message from a vehicle to a cellular infrastructure and then to a network element such as a V2X application server. Any of a Multimedia Broadcast Multicast Service (MBMS) broadcast, ProSe broadcast, or Uu unicast might then be used to get a V2X message from the V2X application server via the cellular infrastructure to ITS stations.

Figure 2:
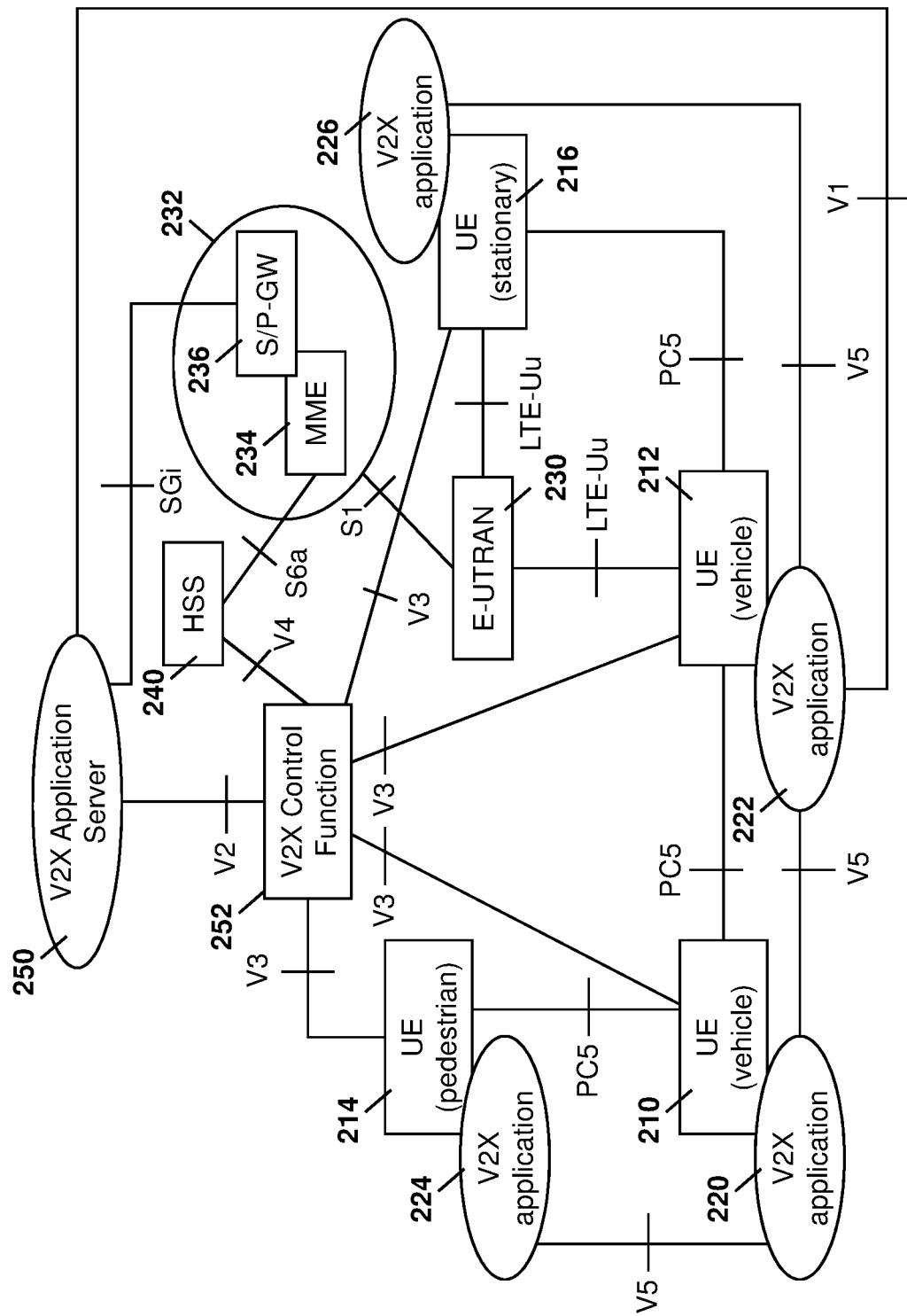
FIG. 2 is a block diagram showing an architecture for cellular based Vehicle to anything (V2X) communication.

For example, reference is now made to FIG. 2, which shows an example 3GPP system architecture that may be used for uplink and downlink communications for both the case of a Uu unicast, as well as for a PC5 transmission, as for example defined in the Third Generation Partnership Project (3GPP) Technical Specification (TS) 23.285, "Architecture enhancements for V2X services".

In the embodiment of FIG. 2, each of a plurality of ITS stations is defined as a user equipment (UE). These UEs are shown, for example, as UE 210 which may represent a vehicle ITS station, UE 212 which may represent another vehicle ITS station, UE 214 which may represent a pedestrian ITS station and UE 216 which may represent a stationary road side unit ITS station.

Each ITS station has an associated V2X application. Therefore, UE 210 has a V2X application 220, UE 212 has a V2X application 222, UE 214 has a V2X application 224, and UE 216 has a V2X application 226.

Each of the UEs may communicate with each other through a PC5 broadcast interface.

Further, the V2X applications may communicate between each other using a V5 reference point.

The cellular system may include, for example, an evolved-Universal Terrestrial Radio Access (E-UTRAN) 230, which may be the base station for an evolved packet core (EPC) 232.

The evolved packet core 232 may include a Mobility Management Entity (MME) 234 and a Service/Packet Gateway (S/P-GW) 236.

Communications between the UEs and the E-UTRAN may occur over an LTE-Uu unicast cellular communication channel. Further, the E-UTRAN 230 may communicate with the EPC via an S1 interface.

The EPC 232, and in particular MME 234, communicates with a Home Subscriber Server (HSS) 240 via an S6a interface. Further, the S/P-GW 236 may communicate with a V2X application server 250 utilizing an SGi interface.

The V2X application server 250 is a network entity on the application layer that is accessible via the 3GPP network which provides for various services including receiving uplink data from a UE over unicast or PC5, delivering data to UEs in a target area using unicast delivery and/or PC5 and/or an MBMS delivery, mapping from geographic location information to appropriate target areas over which MBMS transmissions will be made, and providing the MBMS system with the information needed in order to ensure that the MBMS message can be formatted and transmitted over the appropriate area.

The V2X applications 220, 222, 224 and 226 communicate with the V2X application server. The V2X control function is used to provision the UE with necessary parameters in order to use V2X communication.

In the embodiment of FIG. 2, the V2X application server 250 may determine that the V2X messages are the type that need to be shared with other vehicles, which can be achieved using a Uu unicast downlink, PC5 broadcast or MBMS broadcast or multicast.

Figure 3:
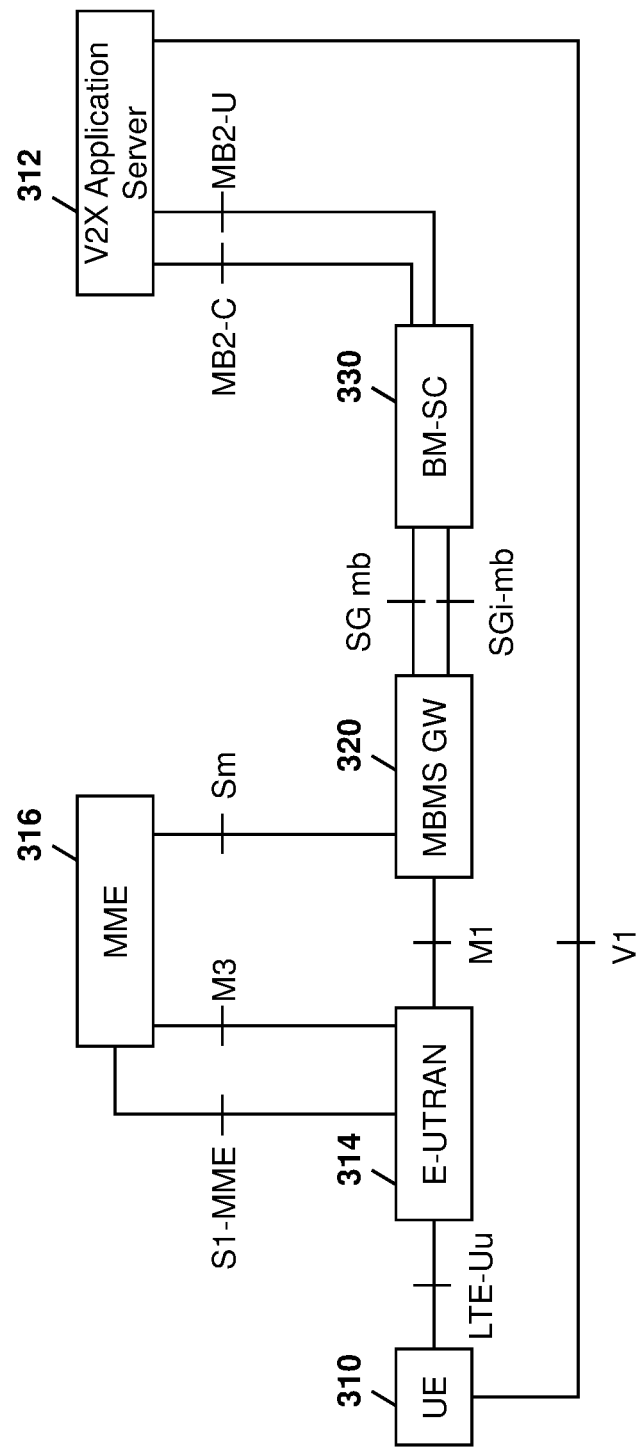
FIG. 3 is a block diagram showing an architecture for cellular broadcast for V2X communication.

For example, for MBMS, a reference architecture is provided with regard to FIG. 3 for LTE-Uu based V2X via MB2.

Specifically, referring to FIG. 3, a UE 310 may communicate with a V2X application server 312 utilizing a V1 reference point. This may be done utilizing an LTE-Uu interface between UE 310 and E-UTRAN 314.

The E-UTRAN 314 may then communicate with MME 316 using an S1-MME interface and M3 reference point.

Further, E-UTRAN 314 may communicate with the MBMS Gateway 320 utilizing an M1 reference point. MBMS Gateway 320 may further communicate with the MME 316 utilizing a Sm reference point.

A Broadcast/Multicast Service Center (BM-SC) 330 may communicate with MBMS Gateway 320 utilizing an SG mb or SGI-mb reference point.

Further, the BM-SC 330 may communicate with the V2X application server 312 using an MB2-C and MB2-U reference point for the control plane and user plane traffic respectively.

Using the architectures of FIGS. 2 and 3, these architectures may therefore be used for unicast uplink and/or downlink via an infrastructure. In particular, an ITS station such as a vehicle may utilize a Uu unicast uplink and downlink messaging between a V2X application and the E-UTRAN (or other, similar, enhanced Node B (eNB)). Such communication may be directed to the V2X application server, which may be used to deliver data to multiple users in an area using unicast messaging.

In this case, the V2X control function 252 may be used to provision the UE with the parameters needed for V2X communication and the MME 234 may be used to determine whether the ITS station is authorized to use V2X.

With regard to broadcast downlink transmissions via the infrastructure, the V2X application server may support delivering data to an appropriate target area. In this case, the V2X application service supports "network edge" deployment of MBMS. Further, the BM-SC 330 from FIG. 3 above provides functionality to support "network edge" deployment of MBMS.

From FIG. 3 above, the MBMS gateway 320 allows for IP multicast to multiple eNBs or E-UTRANs to allow communications with ITS stations communicating with different e-NBs.

Side-Link Broadcast by Device

In a further embodiment, ITS stations may communicate through side-link communications in cellular V2X. The 3GPP network feature on which this communication is based is called Proximity Services (ProSe). The interface is called PC5 and is a type of device to device (D2D) communication.

The term "side-link" refers to communication that is direct from a device to another device, in contrast to "uplink" which is from a device to a network or "downlink" which is from the network to a device.

Side-link communications include direct communications between devices, without necessarily involving any infrastructure. In the case of V2X, this could include a first ITS station broadcasting directly to other ITS stations in proximity. In addition, a device can be collocated with an infrastructure node, allowing ProSe communications between a device and an infrastructure node.

Thus, side-link communications can be done by an autonomous mode, in which no infrastructure components are utilized and transmitting ITS stations autonomously determine when to broadcast to other ITS stations. Alternatively, the side-link communication can be performed in a scheduled mode in which an infrastructure component such as an eNB may schedule the times at which an ITS station may transmit a message on the PC5 side-link interface.

Security in V2X

In V2X communications, there are various security challenges that need to be overcome. A first challenge concerns trust between the ITS stations. In particular, an ITS station may deliberately or unintentionally send out messages with incorrect content. Unintentional messaging may, for example, be based on sensor faults, among other options.

Receiving ITS stations would typically want to avoid acting on incorrect messages. Thus, a vehicle receiving an incorrect ITS message may, for example, unnecessarily apply its brakes, move over, among other options, thereby causing traffic problems. In some cases, this may be overcome by doing plausibility checks on information received in V2X messages and comparing such information with information received from other sensors such as video cameras, lidar, radar, among other options. However, this is not always possible.

A further security challenge in V2X deals with privacy. In particular, no single entity should be able to track a vehicle merely through V2X messaging. Thus, road users should be unable to track one another and, further, operators of a Security Credential Management System (SCMS) or wireless network operators should also be unable to track road users.

A further security challenge for V2X is integrity and replay protection. In particular, messages should be unable to be tampered with, for example utilizing a "man in the middle" attack. Messages previously transmitted and replayed should be detected.

A further consideration for security in V2X is non-repudiation. For example, if an accident occurs, senders of messages should not be able to deny that they sent such messages. This is especially true if such messages may be directly or indirectly causal in the accident.

Based on the above, a security credential management system has been and continues to be developed. The system involves a number of parties, including the Crash Avoidance Metrics Program (CAMP) industry consortium, the United States Department of Transportation, the United States National Highway Traffic Safety Administration, IEEE, and the Society for Automobile Engineers (SAE). Such groups have created a solution based on IEEE 1609, which is a series of standards for dedicated short range communications, as well as IEEE 802.11p with V2X application layer specifications provided by SAE. Security aspects are standardized in IEEE 1609.2. The solution sometimes goes by the name of DSRC/WAVE.

CAMP have further defined an SCMS that is influencing both proof of concept pilots and work in various standards. Such security work is outlined in general below.

In particular, in a first aspect of security, a V2X message has a particular format. Typically, the V2X message comprises three main parts. The first part is the application message content. The second part is the signature of the message provided by the sending ITS station. The third part of the V2X message is a certificate which is signed by a certificate authority.

CAMP uses elliptic curve Qu-Vanstone (ECQV) implicit certificates for V2X communication.

To explain how implicit certificates are used, the simpler case of the use of explicit certificates is first described. An explicit certificate contains the sender's public key, appropriate administrative information, such as the identity of the issuing certificate authority (CA) a validity period, the identity of the sender, crypto algorithm identifiers, amongst other such information. Such information is signed with the certificate authority's private key. After verifying the enclosed signature with a trusted copy of the certificate authority's public verification key, the receiver of the V2X message can then simply copy out from the data structure the sender's public key and any required information.

The certificate authority produces the signature, which forms part of the certificate, by first performing a hash of the information in the certificate, including the sender's public key and administration information, in order to produce a fixed length scrambled block of data called a hash. The certificate authority's private key is then applied to this hash. The signed hash is termed the "signature" of the certificate.

To check that the certificate is authentic, the receiver verifies the signature in the certificate using the certificate authority's public key.

In this way, the signature for the message is used by the recipient to ensure that the message contents were indeed sent by the sending ITS station, which has the private key that is paired to the public key that was provided in the certificate. Signing a message for use with an explicit certificate involves first performing a hash of the V2X message context in plain text in order to produce a fixed length scrambled block of data called a hash. The sender's private key is then applied to the hash and this signed hash is termed the signature. To check that the signature and message contents do indeed belong together the receiver first performs a hash of the V2X message contents and verifies the signature using this hash and the sender's public key.

As indicated above, rather than explicit certificates, the CAMP uses elliptic curve Q-Vanstone implicit certificates for V2X communication. These are specified in IEEE 1609.2.

An ECQV certificate does not contain an explicit sender's public key. An ECQV certificate comprises administrative information, similar to that described above with regard to the explicit certificate, and an elliptic curve (EC) point, called the public reconstruction key. The desired sender's public key is calculated by the receiver using a short calculation which uses the issuing certificate authority's public verification key, the public reconstruction key and the administrative information. ECQV certificates are smaller than explicit certificates because no signature is contained, hence they are preferred for use in resource constrained environments.

In the V2X environment, each ECQV certificate is at least 64 bytes smaller than the explicit certificate.

During use, the sender would sign the V2X message contents using its private key and send the signed message along with its ECQV certificates to the recipient. The recipient then calculates the sender's verification public key from the ECQV certificate and the certificate authority's public key. The calculated public key can now be used to verify the signed message.

Based on the above, a vehicle or other ITS station could send a message signed with one of its private keys, referred to as a, and the corresponding implicit certificate, including for example (P, info) to the recipient ITS station. In the above, P is the public reconstruction key and info is the administrative information. The recipient extracts the sender's public verification key by calculating eP+D, where e=hash(info,P) and D is a trusted copy of the certificate authority's public verification key, The receiver then uses the sender's public verification key to verify the signature on the message. This is for example illustrated in FIG. 4.

Figure 4:
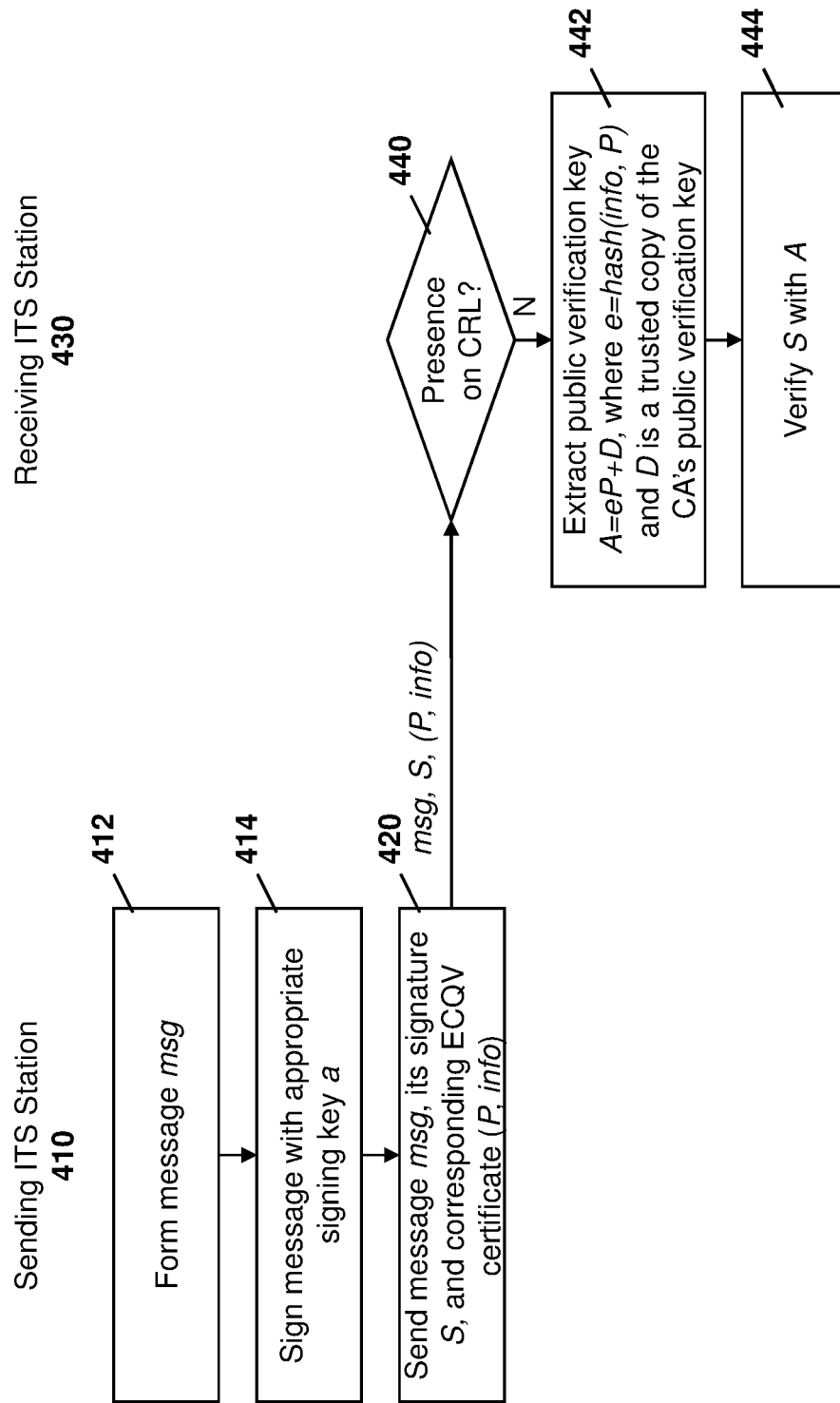
FIG. 4 is a data flow diagram showing a process for verifying messages between a sending ITS station and a receiving ITS station.

Referring to FIG. 4, a sending ITS station 410 first forms a message at block 412. The sending ITS station then signs the message with an appropriate key a, shown by block 414.

The sending ITS station 410 then sends the message, its signature s, and the corresponding ECQV certificate (P, info) as shown by block 420.

The receiving ITS station 430 may then check a certificate revocation list for the presence of the certificate, as shown at block 440. The certificate revocation list is described in more detail below.

If the certificate is not on the revocation list, the receiving ITS station 430 may then extract the public verification key A=eP+D. This is shown at block 442.

The receiving ITS station 430 may then verify S with A, as shown at block 444.

One issue with the above is that a vehicle with a single static certificate could be tracked by infrastructure network elements or by other road users. To avoid this, an ITS station may be assigned a number of certificates for a certain time period, after which such certificates are discarded. For example, a vehicle or other ITS station may be assigned twenty certificates within a given week, after which the certificates are discarded.

An ITS station may cycle through the certificates, using each one only for a certain time period before another certificate is used instead. For example, each certificate may be used for five minutes, after which the next certificate is used. Each certificate further may include a different pseudonym as an identifier. Such use of rotating certificates may prevent the tracking of the vehicle by infrastructure elements.

Misbehavior Authority

A misbehavior authority determines whether messages from an ITS station are trustworthy. If the misbehavior authority determines that an ITS station can no longer be trusted then the ITS station certificates are revoked.

In this way, recipients of the V2X messages may be able to check whether the received certificate is still valid and has not been revoked. This is typically done by putting certificate identifiers of untrustable certificates on a certificate revocation list.

However, such certificate revocation lists may become very large. Each vehicle is issued with approximately 20 certificates per week and may be issued with many years' worth of certificates. In this regard, each vehicle or ITS station that has its certificates revoked would add many certificates to such certificate revocation list.

Further, a geographic region for CRLs is generally large, leading to many ITS stations potentially being on the list.

In order to overcome this, CAMP has decided to use hash chains. A hash chain starts with a seed value and hashes it, and then hashes this hash, then hashes this hash and so on. The result is a sequence of values, called linkage seeds, each of which is the hash of the previous linkage seed. Linkage values may be generated from the linkage seeds.

When generating the ECQV certificates, the certificate authority places the $k^{th}$ linkage value (or a portion thereof) in the administrative portion of the certificate governing the $k^{th}$ time usage. To revoke an ITS station, the misbehavior authority places the current linkage seed in the CRL.

A recipient can quickly calculate the appropriate linkage value associated with a linkage seed on the CRL and compare it with the linkage value in the certificate. If the linkage values match, the certificate and its associated V2X message is rejected.

ITS stations can compute the linkage values associated with each linkage seed on the CRL on a weekly basis and save them in memory.

The above description is however simplified. CAMP requires two sets of hash chains for privacy reasons. Each generally utilizes the above behaviour.

In CAMP, linkage values are generated by two Link Authorities (LA1 and LA2). Each generates a random linkage seed per ITS station, $ls_1(0)$ and $ls_2(0)$, respectively. The linkage authorities then generate linkage seeds iteratively for subsequent times i, $ls_1(i)$ and $ls_2(i)$, respectively, where i corresponds to a number for a week.

Linkage values are generated from these linkage seeds and are placed within the ECQV certificates. Two different linkage values are provided for each of the certificates that a vehicle may use within the given week. For time value (i,j), LA1 calculates the value $plv_1(i,j)$ as a function of $ID_{LA1}$, $ls_1(i)$, and j using AES and XOR. In this case, j corresponds with a given certificate that is used within the week i.

More specifically, the first linkage seed is used as a key in an AES operation to produce a set of bits which is XOR'd with the equivalent set of bits provided using the $2^{nd}$ linkage value, and this is what is provided in the certificate by the transmitting ITS stations. Such operations are performed by the certificate authority.

For each misbehaving ITS station, the CRL contains two linkage seeds, one from each link authority, from which the receiving vehicle can generate all possible linkage value pairs that might potentially be used by that misbehaving vehicle at any given time during that week or subsequent weeks. The vehicle receiving the V2X message performs the same AES and XOR operations as described above on the linkage value pairs derived from the linkage seed information in the CRL.

By comparing this sequence with the sequence received in the certificate, the V2X message receiving ITS station can determine whether a message should be discarded because it is sent by an untrustworthy vehicle.

With this system, neither link authority can track a particular vehicle without colluding with the other link authority.

Figure 5:
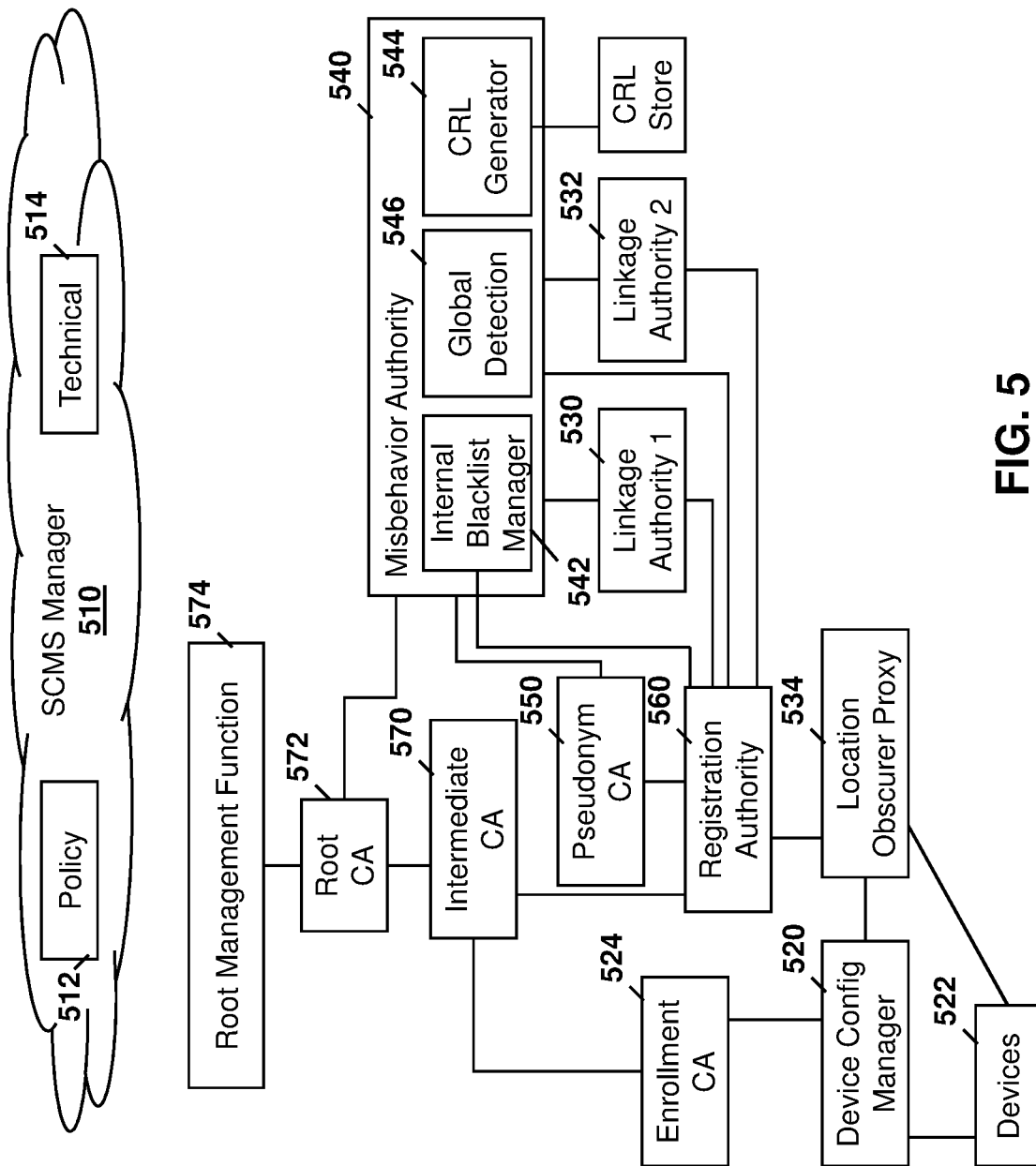
FIG. 5 is a block diagram showing logical roles in a security credential management system.

Based on the above principles, a CAMP system architecture is described with regard to FIG. 5.

In particular, the embodiment of FIG. 5 provides a structure in which at least two logical roles need to collude in order to obtain enough information to track a vehicle and hence to mitigate against unauthorized collusion these two logical roles can be carried out by different organizations.

In the embodiment of FIG. 5, the SCMS manager 510 sets the misbehavior revocation policy, shown at block 512, and further provides technical information shown at block 514.

The device configuration manager 520 provides SCMS configuration information to various devices 522. For example, the device configuration manager 520 may provide network addresses, changes in network element certificates, among other information.

The enrolment certificate authority 524 issues enrollment certificates to the device, which the device can then use for obtaining pseudonym certificates, among other information. Further, different enrolment certificate authorities may issue enrolment certificates for different geographic regions, manufacturers or device types.

A linkage authority, such as linkage authorities 530 and 532, generates linkage values that are used in the certificates and support certificate revocation. The use of two linkage authorities prevents an operator of a single linkage authority from linking certificates belonging to a particular device and thereby prevents a single linkage authority from tracking devices.

A location obscurer proxy 534 changes device source address and prevents the linking of network addresses to location.

A misbehavior authority 540 determines which devices are misbehaving according to reports that it receives, and enters such devices on a blacklist managed by internal blacklist manager 542 and on the CRL, managed by CRL generator 544. The detection of misbehavior is done through a global detection module 546.

A pseudonym certificate authority 550 issues pseudonym certificates to devices, each certificate only being usable over a limited and specified time. Pseudonym certificate authorities may be limited to use for a particular geographic region, used by a particular manufacturer or used by a particular device type.

The registration authority 560 validates, processes and forwards requests for pseudonym certificates to the pseudonym certificate authority 550.

An intermediate certificate authority 570 is part of a chain of trust back to the Root CA 572 that enables the intermediate CA to issue certificates on behalf of the Root CA 572. A Root certificate authority 572 is a trusted entity which issues certificates that can be used to verify information or identity provided by the sender of the certificate. The Root CA may be managed by a root management function 574.

Utilizing the structure of FIG. 5, fast verification of signatures is possible. Fast signature verification as specified in IEEE 1609.2, section 5.3.1 as being a technique which can be used in the regular DSRC system to reduce processing burden when checking signatures. In particular, this section states:

This standard specifies use of the Elliptic Curve Digital Signature Algorithm (ECDSA) specified in Federal Information Processing Standard (FIPS) 186-4, optionally with the inclusion of additional information in the signature as specified in SEC 1 Version 2. See, also, Sect. 6.3.29: If the signature process followed the specification of SEC 1 and output the elliptic curve point R to allow for fast verification, R is represented as an EccP256CurvePoint indicating the choice compressed-y-0, compressed-y-1, or uncompressed at the sender's discretion.

However, the use of CRLs to manage misbehaving vehicles or V2X endpoints has drawbacks based on various factors.

A first factor may be the length of the CRLs, which can be very large. In particular, a CRL may pertain to a very large geographic area and there may be many vehicles in such geographic area. Further, there may be multiple CRLs per ITS station or service type and this may lead to a number of large CRLs that may be required to be searched prior to identifying misbehaving vehicles.

The use of large CRLs can be onerous for both processing and in terms of memory for ITS stations that are the recipients of V2X messages. Each ITS station has to compare an identifier of the certificate of each received message with the identity of all certificates indicated by the CRL. The comparing would determine whether the message could be trusted.

For example, in an urban environment, an ITS station could receive around 1000 signed messages each second, based on 100 vehicles or ITS stations in proximity to each other, where each ITS station is sending 10 messages per second. This may, for example, be Basic Service Messaging.

Additionally, there may be potentially wasted cellular resources in provisioning large CRLs or sets of CRLs to ITS stations. Resources are also wasted in conveying cellular network messages in the downlink that are merely going to be discarded by the ITS station receiver.

Based on this, in accordance with the embodiments of the present disclosure, a V2X application server may be used to process messaging and to indicate such processing in the messaging delivered to ITS stations.

For example, in the case of cellular V2X, where a message from a sending vehicle is sent or broadcast to another vehicle via the V2X application server that is accessed by the cellular infrastructure, then the V2X application server may first determine whether the sending ITS station message is trustworthy. If the message is not trustworthy, the application server may have the choice of either not forwarding the message to the other ITS station or stations through the cellular infrastructure, or marking the message before sending it back through the cellular infrastructure for transmission towards the other ITS station or stations.

Figure 6:
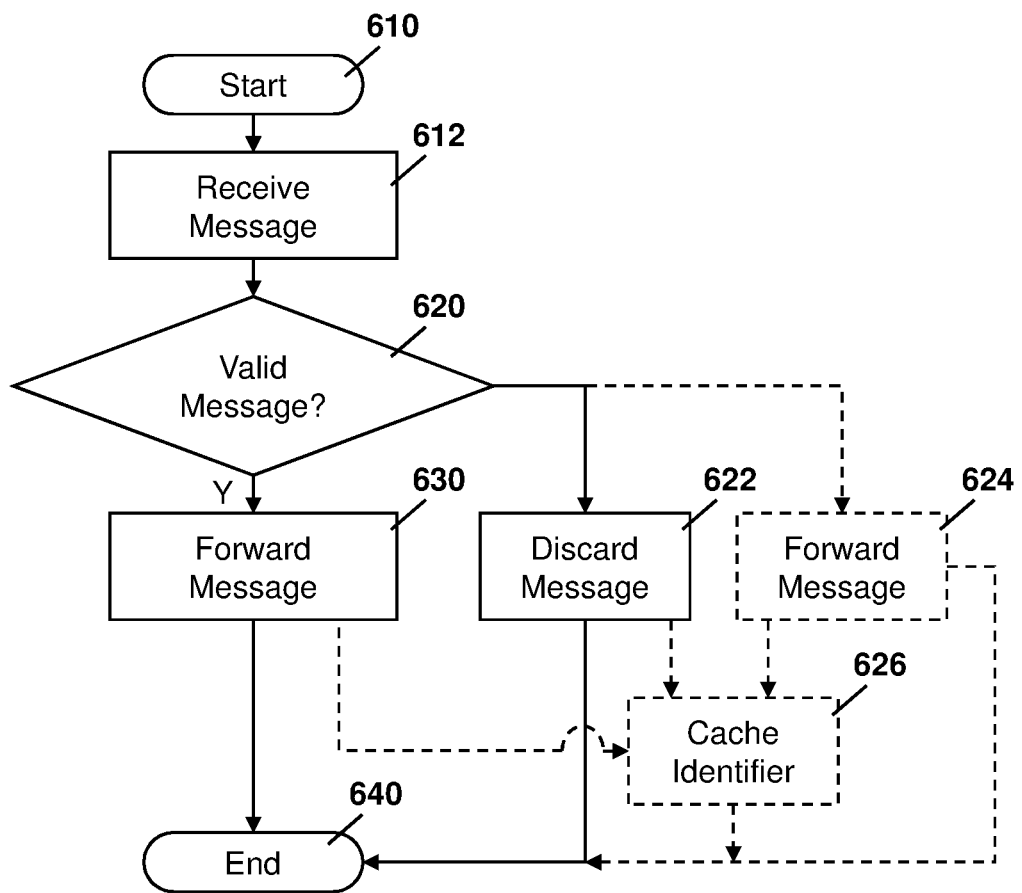
FIG. 6 is a process diagram showing a process at a network entity for verifying V2X messages in transit to a receiving ITS station.

Reference is now made to FIG. 6, which shows a process at a network element such as a V2X application server. The V2X application server may be a trusted server associated with a cellular network or with another type of network.

In particular, the process of FIG. 6 starts at block 610 and proceeds to block 612 in which a message from a sending entity such as an ITS station is received by the application server. For example, the message at block 612 may be a basic safety message. The message could have been sent by an ITS station or from another V2X application server within the network. If the message is sent by an ITS station on or near the road, then the message may be transmitted from the ITS station over the cellular network on the uplink using a Uu unicast or using a side link ProSe (PC5) connection.

From block 612, the process proceeds to block 620 in which a check is performed on the message received at block 612. In particular, the check at block 620 could involve one or more of a plurality of checks on the message.

Specifically, a first check may be whether the linkage value in the certificate of the message received at block 612 is associated with a linkage value computed from the linkage seeds provided on the CRL. Stated more generically, the first check may be whether the sending vehicle's certificate appears on the CRL.

A second check at block 620 may be whether the certificate is authentic. In other words, the check may be whether the certificate signature is consistent with the certificate contents.

A third check at block 620 may be a check that the message received at block 612 is correctly signed. In other words, the third check may be that the V2X message signature correctly corresponds with the V2X message contents and that message is correctly associated with the certificate that has been provided. This third check may optionally be achieved using a fast signature verification approach, as described above.

A fourth check at block 620 may be to check for data plausibility in the V2X message. For example, a data plausibility check may be that if the vehicle reports that is doing 1000 km/h, or has an altitude of 10,000 meters, then such reports are implausible and the message may be discarded. Such plausibility check could use thresholds that are set at the V2X application server, for example, to determine whether the data in the message is within the thresholds to be plausible. As would be appreciated, the V2X application server will often have less information at its disposal to perform data plausibility checks than would be the case for a receiving vehicle that is in the vicinity of the transmitting ITS station that transmitted the original message.

Any one or a combination of the four checks above may be performed in any order at block 620 to determine whether the message is valid.

If the message is found to not be valid, then the process may proceed to block 622 in which the message is discarded. In other words, the message would not be forwarded into the cellular network for onward transmissions to other vehicles.

Alternatively, the process may proceed from block 620 to block 624 in which the message is forwarded to vehicles anyway, but with additional information added to the message to indicate that checks have been performed in the infrastructure and, for each check, whether the message passed or failed.

In particular, the message received at block 612 may be modified prior to forwarding with a notification on whether checks have been performed by the infrastructure, and if so whether or not the checks were passed. Thus, where some or all of the checks described above have been performed, this could be indicated to the receiving ITS station. In this way, the burden of performing these checks can be removed from the ITS station V2X message receiver processors, since the ITS station may choose not to re-perform the checks.

The indication that the checks have been performed may be provided through a new field of the message that is forwarded to the ITS station receivers. Alternatively, the V2X checking services provided by the V2X application server associated with the 3GPP network could be indicated to users on a 3GPP network broadcast channel.

For example, reference is made to Table 2 below, which shows proposed new fields in the V2X CAM message providing an indication of "checking services" that have been performed.

TABLE 2

Indication of 'checking services' performed on a particular message using new fields in a V2X CAM message CAM-PDU-Descriptions {
itu-t (0) identified-organization (4) etsi (0) itsDomain (5) wg1 (1) en (302637)
cam (2) version (1)
}
DEFINITIONS AUTOMATIC TAGS ::=
BEGIN
IMPORTS
ItsPduHeader, CauseCode, ReferencePosition, AccelerationControl,
Curvature, CurvatureCalculationMode, Heading, LanePosition,
EmergencyPriority, EmbarkationStatus, Speed, DriveDirection,
LongitudinalAcceleration, LateralAcceleration, VerticalAcceleration,
StationType, ExteriorLights, DangerousGoodsBasic, SpecialTransportType,
LightBarSirenInUse, VehicleRole, VehicleLength, VehicleWidth,
PathHistory, RoadworksSubCauseCode, ClosedLanes, TrafficRule,
SpeedLimit, SteeringWheelAngle, PerformanceClass, YawRate,
ProtectedCommunicationZone, PtActivation, Latitude, Longitude,
ProtectedCommunicationZonesRSU, CenDsrcTollingZone FROM ITS-
Container {
itu-t (0) identified-organization (4) etsi (0) itsDomain (5) wg1 (1) ts (102894)
cdd (2) version (1)
};
-- The root data frame for cooperative awareness messages
CAM ::= SEQUENCE {
   header ItsPduHeader,
   cam CoopAwareness
}
CoopAwareness ::= SEQUENCE {
   generationDeltaTime GenerationDeltaTime,
   camParameters CamParameters
}

TABLE 2-continued

Indication of 'checking services' performed on a particular message using new fields in a V2X CAM message

```
CamParameters ::= SEQUENCE {
    basicContainer BasicContainer,
    highFrequencyContainer HighFrequencyContainer,
    lowFrequencyContainer LowFrequencyContainer OPTIONAL,
    specialVehicleContainer SpecialVehicleContainer OPTIONAL,
    proxyContainer ProxyContainer OPTIONAL
    ...
}
....
ProxyContainer ::= SEQUENCE {
    proxyPerformedCRLcheck       ProxyPerformedCRLCheck
    proxyPerformedCertCheck      ProxyPerformedCertCheck,
    proxyPerformedMsgSigCheck    ProxyPerformedMsgSigCheck
    proxyPerformedDataPlausibility ProxyPerformedDataPlausibility
    ...
}
....
END
```

In Table 2 above, new indications are shown with bold. In particular, the ProxyPerformedCRLCheck is a data structure containing two indicators. A first indicator indicates whether a proxy has already checked that the certificate is not identified on a CRL. A second indicator may indicate whether the check has passed or failed.

Further, in Table 2, the ProxyPerformedCertCheck field may be a data structure containing two indicators. One indicator provides an indication of whether the proxy has already checked the authenticity of the certificate that was provided from the vehicle which originally sent the CAM message. A second indicator may be one which indicates whether the check passed or failed.

From Table 2 above, a third field may be the ProxyPerformedMsgSigCheck. This field is a data structure that may contain two indicators. A first indicator may indicate whether a proxy has already performed the check to ensure that the associated V2X message that was provided from the ITS station that sent the original message, and its corresponding message signature are correct. A second indicator in this field may indicate whether the check passed or failed.

Further from Table 2 above, a ProxyPerformedDataPlausibility field may be a data structure which may contain two indicators. One indicator may be whether or not the proxy has already performed basic data plausibility checking of the V2X message contents. Basic data plausibility refers to plausibility checks that may optionally be performed without access to sensor information of sensors in the locality of the V2X message originating vehicle. A second indicator may be whether the check passed or failed.

In the indicators above, the indicators may be represented by 1 or more bits.

The fields provided in Table 2 are however merely examples, and in some cases more fields may be provided. In other cases, only a subset of the fields in Table 2 may be provided. Other options are possible.

In one option, instead of indicating to the receiving ITS station which checks have been performed by a network element, the network element indicates to the ITS station which checks the ITS station is required to do or which checks the ITS station is not required to do.

While Table 2 denotes a CAM message, similar approaches could be employed for any specified V2X application message, including ETSI DENM messages or SAE defined Basic Safety Messages.

Further, the V2X application server, once it has performed security checks, could also remove security information from the V2X message before forwarding it back into the cellular network. In this way, there would be a saving of radio resources. In addition, an implicit indication would be provided to receiving ITS stations that security checks have already been performed. Examples of security information that could be removed from the V2X message forwarded at block 630 could include removal of the certificate and removal of the message signature.

Referring again to FIG. 6, if the message is forwarded as shown at block 624, then the receiving ITS station will need to trust the contents of such message. In particular, in order for a V2X message receiving ITS station to make use of checks that have been performed by the V2X application server, or to be satisfied in the event that the infrastructure has removed certain application layer security information altogether, and hence reduce the processing burden of such receiving ITS station, the receiving ITS station must be able to trust the infrastructure that has performed the checks and/or message modifications.

Trust may be achieved in various ways. In a first option, the V2X application server, or at least parts thereof that performed the checks and/or message modifications may be considered to be within the operational domain of the 3GPP operator. In this case, by nature of the application server being within the domain of the 3GPP operator, the domain would be considered to be trusted and thus the application server would also be considered to be trusted.

Trust between the ITS station and the 3GPP Operator domain of which the cellular network and optionally the V2X application server is part, can make use of existing methods. Specifically, ITS stations communicating with the 3GPP access networks for the purpose of V2X message transmission may have mutually authenticated themselves with the 3GPP network using, for example, Subscriber Identity Module (SIM) credentials using the 3GPP attach procedures for example.

In this way, vehicles may be confident that they are communicating with an authentic 3GPP network and therefore can have the necessary levels of trust. Therefore, when the message created by an operator of a 3GPP network indicates that the V2X message application layer security checks have been performed then the receiving ITS station can trust that such checks have indeed been made. Likewise, where message modifications have been made, the receiving ITS station may trust that the modifications were made within the domain of the 3GPP operator.

In a second alternative, the V2X application server could sign messages that it generates with a private V2X application server key. ITS receiving stations could be pre-provisioned with the public key of the V2X application servers. In this way, vehicles that receive V2X messages from a network can verify the signature and thereby have additional confidence that a trusted V2X application server has performed the security checks and/or message modifications.

This second alternative introduces a new security processing burden on the V2X message receiving devices. However, this may still result in less processing burden than the existing scheme utilizing CRL lists which requires the receiver of the message to evaluate whether the identifier of the received certificate is indicated on the CRL. Further, a time optimization that reduces the burden of the receiving device may be to include optional information in the signature that is created by the V2X application server that allows verification to be carried out faster.

From block 622 or block 624, the process may further optionally proceed to block 626 in which the V2X application server may cache information to identify the certificate or entity associated with the V2X message that failed the check or checks made at block 620. In other words, the V2X application server may cache the pseudonym identifier used for the message so that the V2X application server can more efficiently process future V2X messages from the ITS stations using the same or associated certificate identifier. A pseudonym identifier may for example be a linkage value. Caching may further involve adding associated information with the pseudonym identifier, including one or more of result of security checks, message forwarding behavior, or message discard treatment, among other options. When, at step 620, new messages are received at the V2X application server which have a first pseudonym identifier that is associated with a pseudonym identifier in the cache, then the V2X application server may access this cached information in order to expedite or reduce processing by avoiding repetition of security checks, determination of message forwarding behavior, and/or determination of message discard treatment which may have been performed previously for messages associated with this first pseudonym identifier. Determination of message forwarding behavior may include determination of contents of message fields in the forwarded message which have either been added, removed or changed.

Alternatively, from block 620, if the checks that are performed by the V2X application servers all pass then the process may proceed to block 630 in which a new V2X message containing the same or substantially similar content to the message received at block 612 may be forwarded into the cellular network for transmission to other ITS stations.

The forwarding of the message at block 630 may occur using any one of MBMS downlink, Uu unicast downlink or ProSe PC5 side link for example.

Optionally, additional information may be added to the message to indicate which checks have been performed within the infrastructure elements and optionally which checks have passed. In this way, the processing burden associated with performing these checks can also be removed from the ITS recipient. Thus, the message forwarded at block 630 may have fields similar to those described in Table 2 above.

Optionally, message forwarding behavior may further be cached at block 626 and used at block 620 as described above.

From block 630 the process may proceed to block 640 and end.

Similarly, from blocks 622, 624 or 626 the process may proceed to block 640 and end.

As will be appreciated by those skilled in the art, the embodiment of FIG. 6 may require the application server to obtain the CRL. However, since a V2X application server that interfaces with the 3GPP radio network would typically be required to distribute CRLs to ITS stations over the 3GPP radio network, the application server may simply keep a copy of such CRL for its own checking.

Thus, rather than only forwarding the CRL, the application server may store such CRL for use in the checking at block 620.

Further, as will be appreciated by those in the art, the security and data plausibility checking of V2X messages in the application server associated with the 3GPP operator also applies if the originator of the V2X message is not a vehicle or road user. For example, the embodiment of FIG. 6 could also be applied where a message was originated by or was transmitted via some other V2X application server. Features of block 630 such as omitting security information or indicating that security checks have been performed can also be applied when the V2X application server has generated the message itself. Hence the indication to the receiving ITS station that certain checks have already been done or the omission of certain security information from the messages that are forwarded, may be done even where the V2X message was originated by a V2X application server.

Specifically, in one embodiment, the V2X application server 250 from FIG. 2 above may be combined with the ITS station to form a fixed infrastructure node having application layer capabilities. In this case, the V2X application server would act as an ITS station and form a network element.

Figure 7:
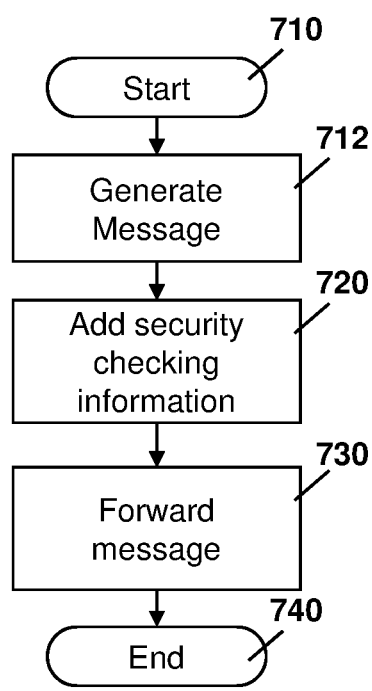
FIG. 7 is a process diagram showing a process at a network entity for generating V2X messages for a receiving ITS station.

Reference is made to FIG. 7, which shows a process at the network entity that is also acting as a V2X application server. In this case, the application server does not edit messages that are in transit between ITS stations, but rather generates messages that will be sent to one or more receiving ITS stations. In this regard, the process starts at block 710 and proceeds to block 712 in which the message is generated.

For example, in one case the V2X application server may form a part of a traffic light. In this case, the message generated at block 712 may include information about the phase of the lights and the color of the light, which may be then broadcast to vehicles approaching the intersection.

In other cases, a V2X application server may have other functionality, and the use of the traffic light example is merely provided for illustration.

From block 712 the process proceeds to block 720 in which security checking information may be indicated in the message. For example, the indication may be added information similar to that described above with regard to Table 2. In particular, the information added to the message may enable a receiving ITS station to know which security checks need to be performed at the receiving ITS station.

In other embodiments, in block 712 the network entity may generate the message without including security information that would appear in a standard V2X message, such as signatures and/or certificates.

Thus, for example, if the V2X application server is a trusted network element, then the ITS station knows that the certificate in a message that is sent from the V2X application server will not appear on a CRL and the receiving ITS station therefore does not need to check any certificate that may be included in the message with a CRL to determine the validity of the message.

Similarly, if the V2X application server is part of the 3GPP network then the certificate or signature may not need to be checked and, from Table 2 above, these fields can be specified as already being performed and therefore the burden on the receiving ITS station may be alleviated.

Similarly, if the V2X application server has information with regard to data plausibility, this may also be added as a field to the message generated at block 712.

From block 720, the process proceeds to block 730 in which the message is forwarded to one or more receiving ITS stations. As with the messages forwarded at blocks 624 and 630 from FIG. 6 above, the message may be forwarded at block 730 through either a broadcast message or a unicast message in some embodiments.

From block 730 the process proceeds to block 740 and ends.

The above embodiments therefore allow certain security checking to be performed at the network or to mark messages generated by the network to indicate security checking is not required in order to reduce the burden on receiving ITS stations.

The application server, ITS stations and network elements described above may be any computing device or network node. Such computing device or network node may include any type of electronic device, including but not limited to, mobile devices such as smartphones or cellular telephones. Examples can further include fixed or mobile user equipments, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others. Vehicles includes motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising.

Figure 8:
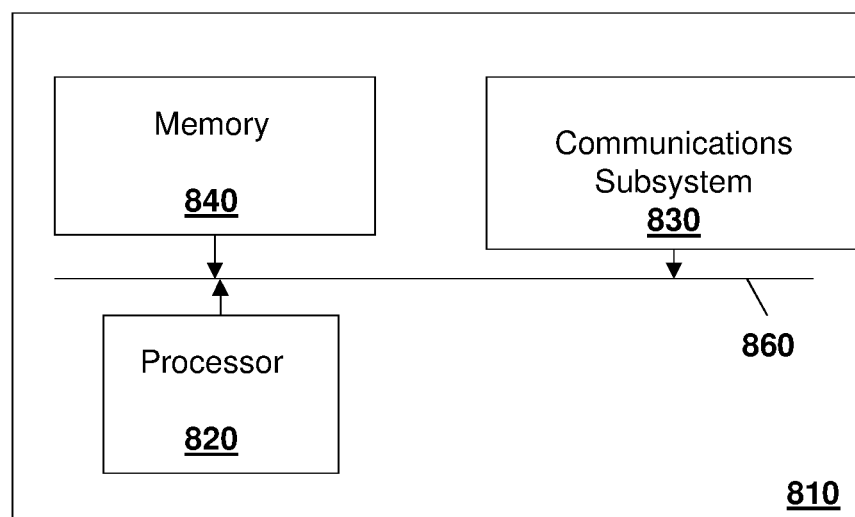
FIG. 8 is a block diagram of an example computing device capable of being used with the embodiments of the present disclosure.

One simplified diagram of a computing device is shown with regard to FIG. 8. The computing device of FIG. 8 could be any mobile device, portable device, ITS station, server, or other node as described above.

In FIG. 8, device 810 includes a processor 820 and a communications subsystem 830, where the processor 820 and communications subsystem 830 cooperate to perform the methods of the embodiments described above. Communications subsystem 820 may, in some embodiments, comprise multiple subsystems, for example for different radio technologies.

Processor 820 is configured to execute programmable logic, which may be stored, along with data, on device 810, and shown in the example of FIG. 8 as memory 840. Memory 840 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 840, device 810 may access data or programmable logic from an external storage medium, for example through communications subsystem 830.

Communications subsystem 830 allows device 810 to communicate with other devices or network elements and may vary based on the type of communication being performed. Further, communications subsystem 830 may comprise a plurality of communications technologies, including any wired or wireless communications technology.

Communications between the various elements of device 810 may be through an internal bus 860 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation described above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a network element for processing a first message, the method comprising:
performing a plurality of checks on the first message, the first message being destined for an intelligent transportation system station being an endpoint associated with a road user, the plurality of checks being performed on behalf of the intelligent transportation system station;
modifying the first message, the modifying removing security information from the first message, thereby creating a second message having an implicit indication that security checks have been performed; and
forwarding the second message to the intelligent transportation system station;
wherein the network element is separate from and trusted by the intelligent transportation system station.

2. The method of claim 1, wherein, on receiving the first message, the method further comprises checking security credentials of the first message, and wherein the checking comprises finding whether a first identifier in a certificate received in the first message is associated with a second identifier of the certificate that is determined from information on a certificate revocation list.

3. The method of claim 2 in which the first identifier in the certificate is a linkage value and the information on a certificate revocation list is one or more linkage seeds.

4. The method of claim 1, wherein, on receiving the first message, the method further comprises checking security credentials of the first message, and wherein the checking comprises verifying that a signature of a certificate in the first message is consistent with contents of the certificate.

5. The method of claim 1, wherein, on receiving the first message, the method further comprises checking security credentials of the first message, and wherein the checking comprises verifying that the first message has a signature that correctly corresponds with contents of the first message and that the first message is correctly associated with a certificate in the first message.

6. The method of claim 1, wherein, on receiving the first message, the method further comprises checking data plausibility of data within the message to ensure data values are within set thresholds.

7. The method of claim 1, wherein the network element is operated by an operator that also operates a cellular network.

8. The method of claim 1, wherein the network element has a previously established trust relationship with the intelligent transportation system station.

9. The method of claim 8 in which the trust relationship is previously established using a cellular network attach procedure.

10. The method of claim 1, wherein the first message is one of a Cooperative Awareness Message; a Decentralized Environmental Notification Message; or a Basic Safety Message.

11. The method of claim 1, further comprising caching an identifier for a sending entity and associated information, including one or more of result of security checks, message forwarding behavior, or message discard treatment.

12. The method of claim 1, wherein the removing the security information from the first message comprises removing one or more signatures or certificates of a sending entity sending the first message via the network element to the intelligent transportation system station.

13. A network element configured for processing a first message, the network element comprising:
a processor; and
a communications subsystem,
wherein the network element is configured to:
perform a plurality of checks on the first message, the first message being destined for an intelligent transportation system station being an endpoint associated with a road user, the plurality of checks being performed on behalf of the intelligent transportation system station;
modify the first message, the network element configured to modify by removing security information from the first message, thereby creating a second message having an implicit indication that security checks have been performed; and
forward the second message to the intelligent transportation system station;
wherein the network element is separate from and trusted by the intelligent transportation system station.

14. The network element of claim 13, wherein, on receiving the first message, the network element is further configured to check security credentials of the first message, and wherein the checking comprises finding whether a first identifier in a certificate received in the first message is associated with a second identifier of the certificate that is determined from information on a certificate revocation list.

15. The network element of claim 14 in which the first identifier in the certificate is a linkage value and the information on a certificate revocation list is one or more linkage seeds.

16. The network element of claim 13, wherein, on receiving the first message, the network element is further configured to check security credentials of the first message, and wherein the checking comprises verifying that a signature of a certificate in the first message is consistent with contents of the certificate.

17. The network element of claim 13, wherein, on receiving the first message, the network element is further configured to check security credentials of the first message, and wherein the checking comprises verifying that the first message has a signature that correctly corresponds with contents of the first message and that the first message is correctly associated with a certificate in the first message.

18. The network element of claim 13, wherein, on receiving the first message, the network element is further configured to check data plausibility of data within the message to ensure data values are within set thresholds.

19. The network element of claim 13, wherein the network element is configured to remove the security information from the first message by removing one or more signatures or certificates of a sending entity sending the first message via the network element to the network element.

20. A non-transitory computer readable medium for storing instruction code for processing a first message, which, when executed by a processor of a network element cause the network element to:

perform a plurality of checks on the first message, the first message being destined for an intelligent transportation system station being an endpoint associated with a road user, the plurality of checks being performed on behalf of the intelligent transportation system station;

modify the first message, the network element being caused to modify by removing security information from the first message, thereby creating a second message having an implicit indication that security checks have been performed; and forward the second message to the intelligent transportation system station;

wherein the network element is separate from and trusted by the intelligent transportation system station.

* * * * *